(12) United States Patent
Rudenick et al.

(10) Patent No.: US 8,620,129 B2
(45) Date of Patent: Dec. 31, 2013

(54) CABLE PULLING ASSEMBLY

(75) Inventors: Paula Rudenick, Eden Prairie, MN (US); Thomas Marcouiller, Shakopee, MN (US); Scott C. Kowalczyk, Savage, MN (US); Jonathan W. Coan, Savage, MN (US); Jonathan R. Kaml, Shakopee, MN (US)

(73) Assignee: ADC Telecommunications, Inc., Berwyn, PA (US)

( * ) Notice: Subject to any disclaimer, the term of this patent is extended or adjusted under 35 U.S.C. 154(b) by 108 days.

(21) Appl. No.: 12/953,630

(22) Filed: Nov. 24, 2010

(65) Prior Publication Data

US 2011/0135268 A1 Jun. 9, 2011

Related U.S. Application Data

(60) Provisional application No. 61/264,309, filed on Nov. 25, 2009.

(51) Int. Cl.
*G02B 6/00* (2006.01)
(52) U.S. Cl.
USPC .............. 385/136; 156/293; 385/138; 385/80
(58) Field of Classification Search
USPC ............. 385/136, 138, 80, 81, 60, 62, 76–78, 385/86; 156/293, 283
See application file for complete search history.

(56) References Cited

U.S. PATENT DOCUMENTS

| 2,231,919 | A | 2/1941 | Kent |
| 3,672,006 | A | 6/1972 | Fidrych |
| 3,858,848 | A | 1/1975 | MacFetrich |
| 3,906,619 | A | 9/1975 | Shaffer |
| 4,368,910 | A | 1/1983 | Fidrych |
| 4,453,291 | A | 6/1984 | Fidrych |
| 4,460,159 | A | 7/1984 | Charlebois et al. |
| 4,684,161 | A | 8/1987 | Egner et al. |
| 4,684,211 | A | 8/1987 | Weber et al. |
| 4,736,978 | A | 4/1988 | Cielker |
| 5,013,125 | A | 5/1991 | Nilsson et al. |

(Continued)

FOREIGN PATENT DOCUMENTS

DE   42 00 865 A1   7/1993
JP   59-177504      10/1984

(Continued)

OTHER PUBLICATIONS

International Search Report and Written Opinion cited in International Application No. PCT/US2010/057972 mailed Aug. 30, 2011.

(Continued)

*Primary Examiner* — Ellen Kim
(74) *Attorney, Agent, or Firm* — Merchant & Gould P.C.

(57) ABSTRACT

A fiber optic cable assembly includes a fiber optic cable and a cable pulling assembly. The fiber optic cable includes a first end and an oppositely disposed second end. The fiber optic cable further includes an outer jacket and a strength member disposed in the outer jacket. The cable pulling assembly is engaged to the second end of the fiber optic cable. The cable pulling assembly includes an enclosure defining a cavity. The second end of the fiber optic cable is disposed in the cavity. An adhesive is disposed in the cavity. The adhesive secures the strength member of the fiber optic cable to the enclosure.

20 Claims, 10 Drawing Sheets

(56) References Cited

U.S. PATENT DOCUMENTS

| | | | |
|---|---|---|---|
| 5,039,196 A * | 8/1991 | Nilsson | 385/136 |
| 5,067,843 A | 11/1991 | Nova | |
| 5,122,007 A | 6/1992 | Smith | |
| 5,133,583 A | 7/1992 | Wagman et al. | |
| 5,245,730 A | 9/1993 | Martin | |
| 5,283,930 A | 2/1994 | Krauss | |
| 5,308,026 A | 5/1994 | Shaw | |
| 5,480,203 A | 1/1996 | Favalora et al. | |
| 5,863,083 A | 1/1999 | Giebel et al. | |
| 5,938,180 A | 8/1999 | Walsten | |
| 6,101,305 A * | 8/2000 | Wagman et al. | 385/113 |
| 6,266,469 B1 | 7/2001 | Roth | |
| 6,396,993 B1 | 5/2002 | Giebel et al. | |
| 6,398,422 B1 | 6/2002 | Szilagyi et al. | |
| 6,719,274 B2 | 4/2004 | Bowling | |
| 6,993,237 B2 | 1/2006 | Cooke et al. | |
| 7,079,734 B2 | 7/2006 | Seddon et al. | |
| 7,246,789 B2 | 7/2007 | Ames et al. | |
| 7,481,585 B2 | 1/2009 | Scadden et al. | |
| 7,621,675 B1 * | 11/2009 | Bradley | 385/81 |
| 8,165,444 B2 * | 4/2012 | Pierce et al. | 385/136 |
| 2006/0133748 A1 | 6/2006 | Seddon et al. | |
| 2008/0240658 A1 | 10/2008 | Leeman et al. | |
| 2009/0238534 A1 | 9/2009 | Ahmed | |
| 2009/0286038 A1 * | 11/2009 | Swift et al. | 428/108 |
| 2010/0322584 A1 | 12/2010 | Kowalczyk et al. | |

FOREIGN PATENT DOCUMENTS

| | | |
|---|---|---|
| WO | WO 2005/072395 A2 | 8/2005 |
| WO | WO 2008/036994 A1 | 4/2008 |
| WO | WO 2009/040567 A1 | 4/2009 |

OTHER PUBLICATIONS

International Search Report and Written Opinion for Application No. PCT/US2010/033886 mailed Aug. 18, 2010.

U.S. Non-Final Office Action for U.S. Appl. No. 12/775,011, mailed Sep. 17, 2012.

* cited by examiner

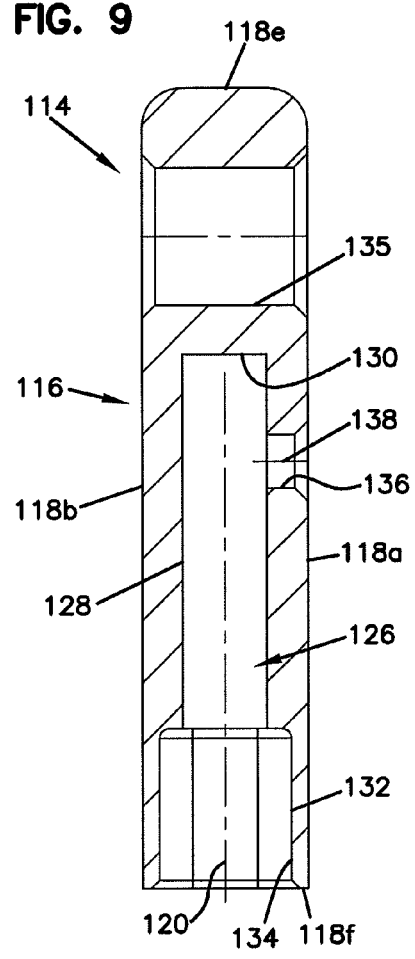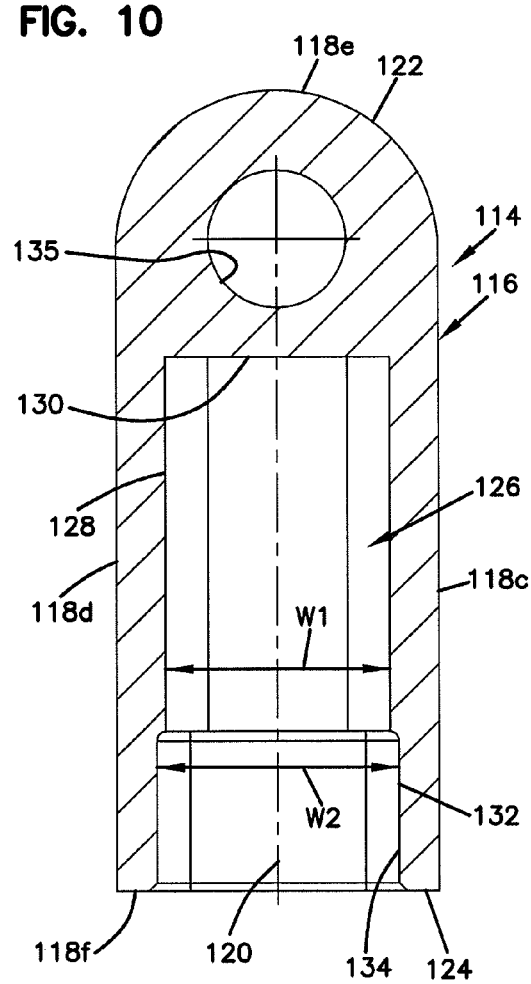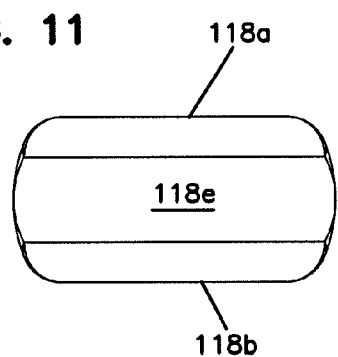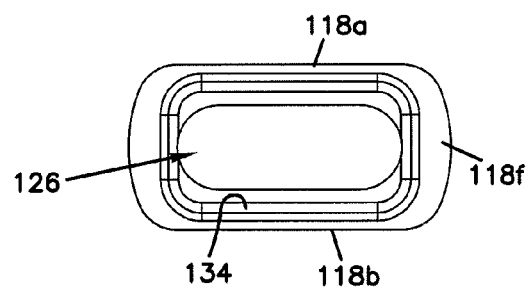

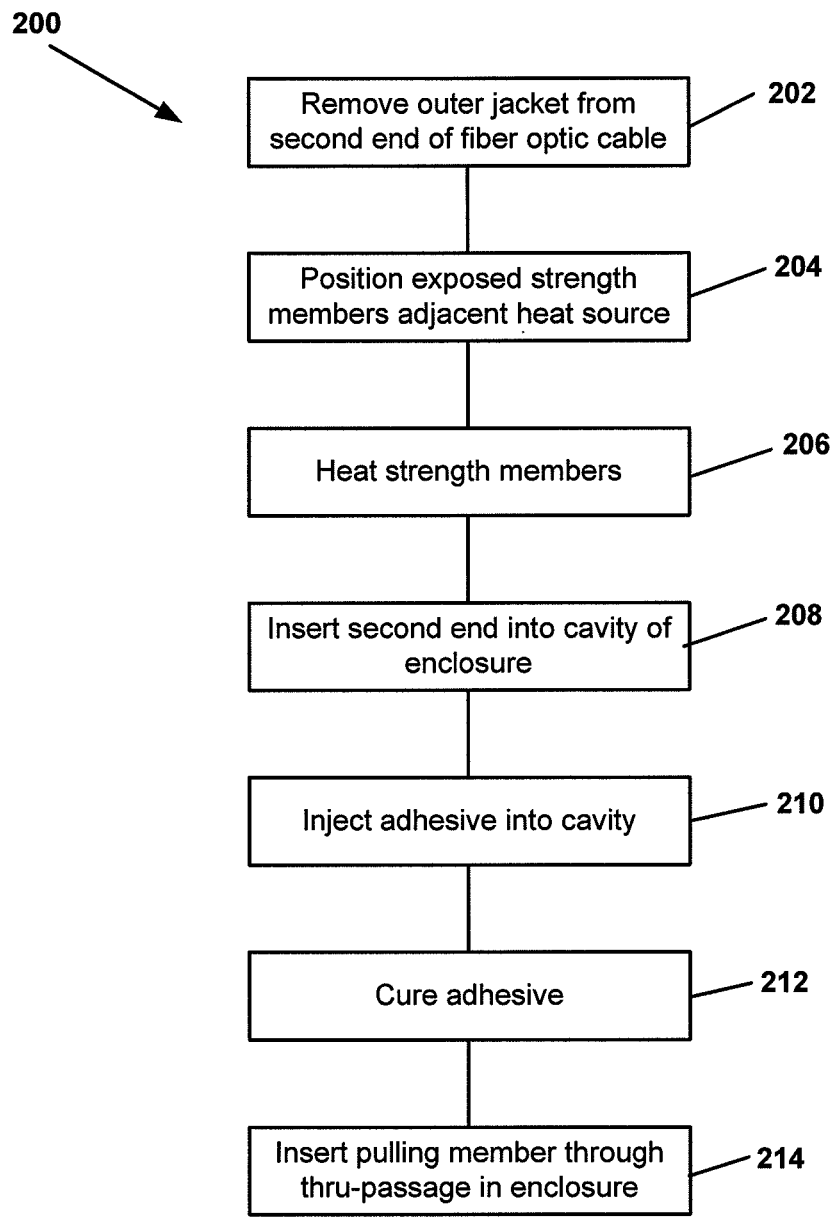

CABLE PULLING ASSEMBLY

CROSS REFERENCE TO RELATED APPLICATION

The present application claims priority to U.S. Provisional Patent Application Ser. No. 61/264,309, entitled CABLE PULLING ASSEMBLY and filed on Nov. 25, 2009, the disclosure of which is hereby incorporated by reference in its entirety.

BACKGROUND

As demand for telecommunications increases, optical fiber services are being extended in more and more areas. In order for a residence or business to access these optical fiber services, fiber optic cables must be installed in these residences and businesses. In some cases, the fiber optic cables are installed in existing structures. In other cases, these fiber optic cables are installed in new constructions.

In either case, however, fiber optic cables are usually routed through enclosed spaces, such as between support structures disposed inside walls. In order to get the fiber optic cable through these enclosed spaces, cable pullers can be used. However, cable pullers are not always preferred since the size of cable pullers can prevent the cable from being pulled through small enclosed spaces.

SUMMARY

An aspect of the present disclosure relates to a fiber optic cable assembly including a fiber optic cable and a cable pulling assembly. The fiber optic cable includes a first end and an oppositely disposed second end. The fiber optic cable further includes an outer jacket and a strength member disposed in the outer jacket. The cable pulling assembly is engaged to the second end of the fiber optic cable. The cable pulling assembly includes an enclosure defining a cavity. The second end of the fiber optic cable is disposed in the cavity. An adhesive is disposed in the cavity. The adhesive secures the strength member of the fiber optic cable to the enclosure.

Another aspect of the present disclosure relates to a fiber optic cable assembly including a fiber optic cable and a cable pulling assembly. The fiber optic cable includes a first end and an oppositely disposed second end. The fiber optic cable further includes an outer jacket and a strength member disposed in the outer jacket. The cable pulling assembly is engaged to the second end of the fiber optic cable. The cable pulling assembly includes an enclosure having an outer surface and defining a cavity. The enclosure includes a fill port that extends through the outer surface and into the cavity. The second end of the fiber optic cable is disposed in the cavity. An adhesive is disposed in the cavity. The adhesive secures the strength member of the fiber optic cable to the enclosure.

Another aspect of the present disclosure relates to a method of installing a cable pulling assembly to a fiber optic cable. The method includes the steps of stripping an outer jacket off an end of a fiber optic cable so that a strength member of the fiber optic cable is exposed. The end of the fiber optic cable is inserted into a cavity of an enclosure of a cable pulling assembly. An adhesive is added to the cavity of the enclosure so that the adhesive bonds the strength member to the enclosure.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

FIG. 9 is a cross-sectional view of the enclosure of FIG. 7.

FIG. 10 is a cross-sectional view of the enclosure of FIG. 7.

Figure 7:
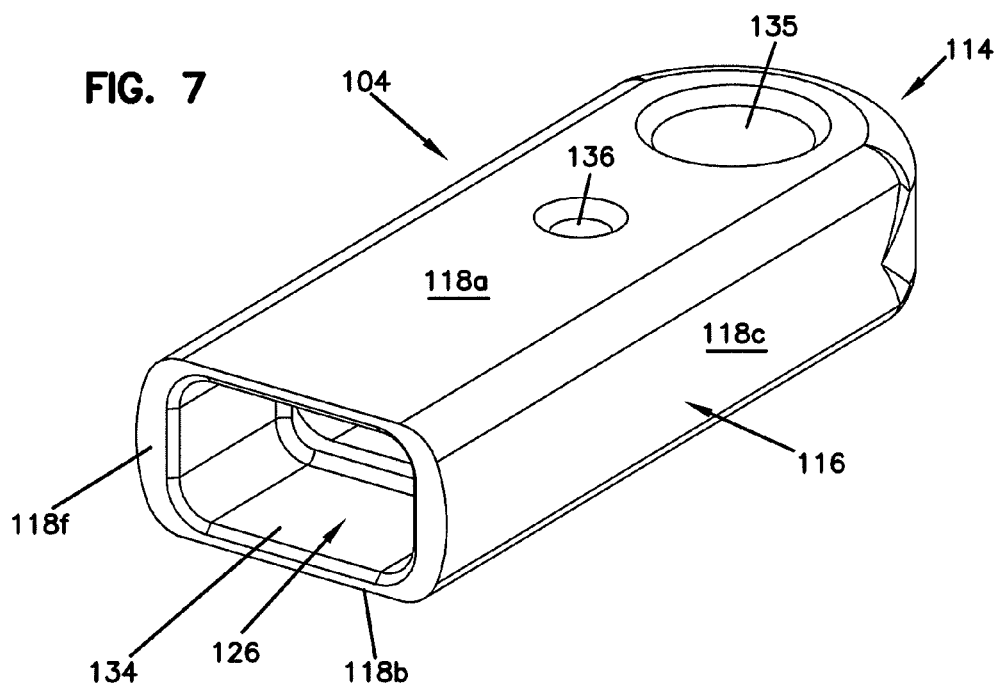
FIG. 7 is a perspective view of an enclosure of an alternate embodiment of a cable pulling assembly suitable for use with the fiber optic cable assembly of FIG. 1.
Figure 8:
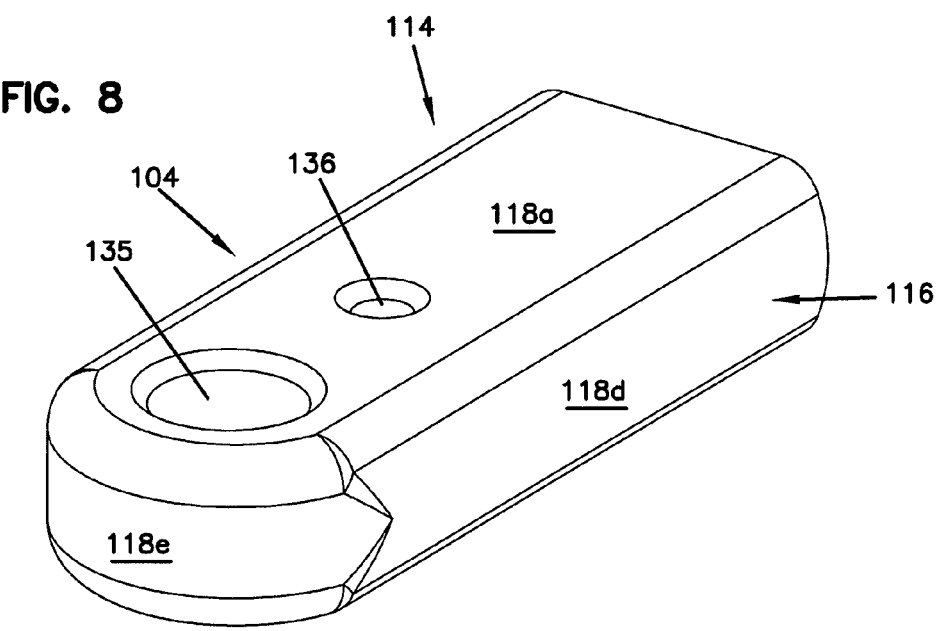
FIG. 8 is a perspective view of the enclosure of FIG. 7.

FIG. 11. is an elevation view of a first axial end of the enclosure of FIG. 7.

FIG. 12 is an elevation view of a second axial end of the enclosure of FIG. 7.

Figure 6:
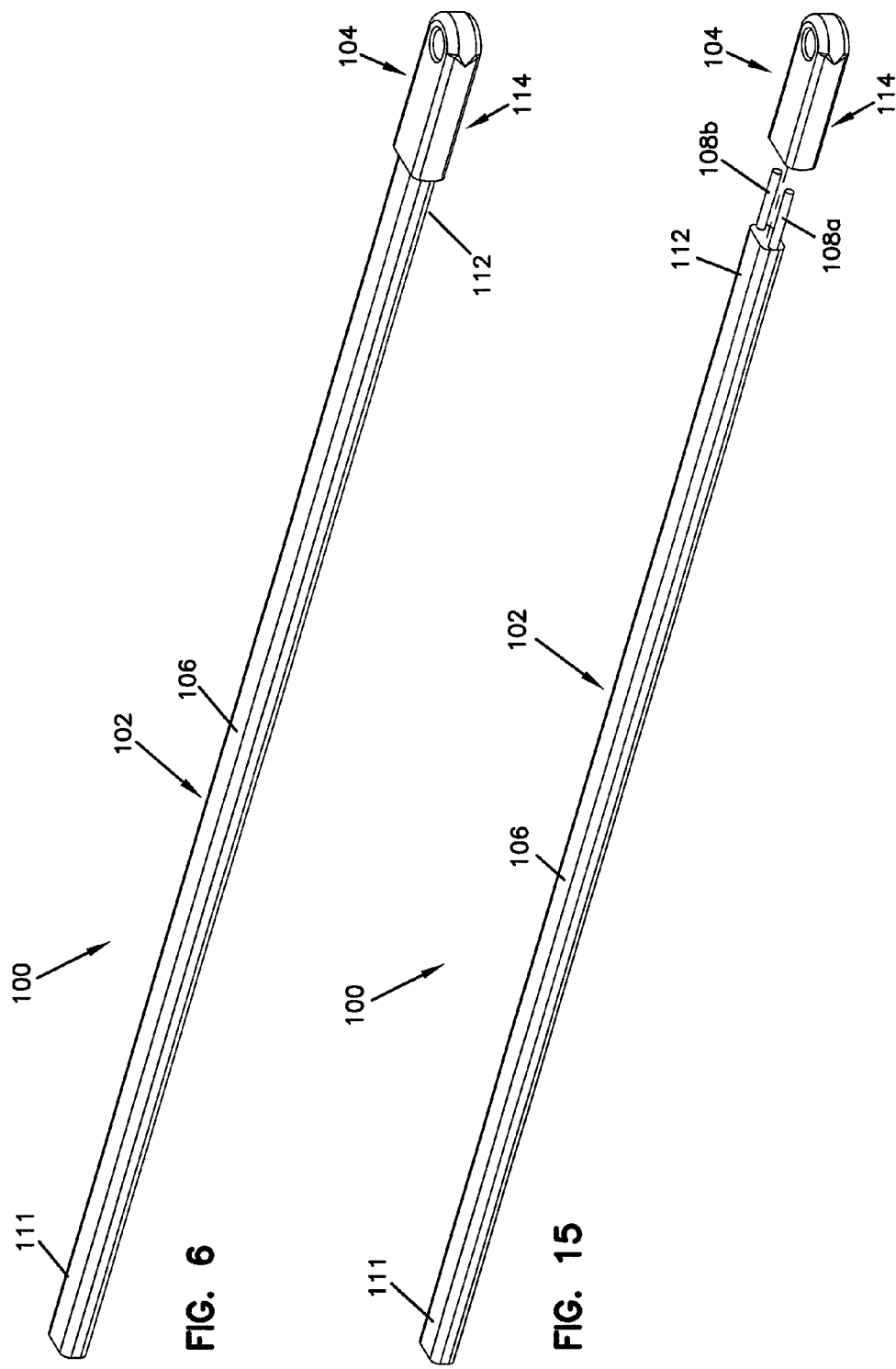
FIG. 6 is a perspective view of a fiber optic cable assembly having exemplary features of aspects in accordance with the principles of the present disclosure.
Figure 13:
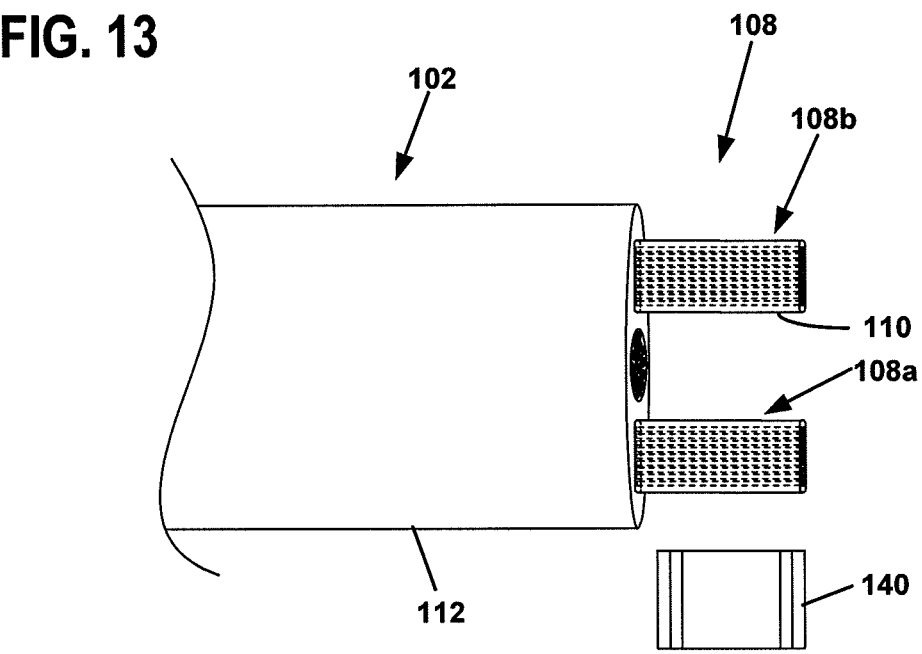

FIG. 13 is a perspective view of a fiber optic cable suitable for use with the fiber optic cable assembly of FIG. 6.

Figure 14:
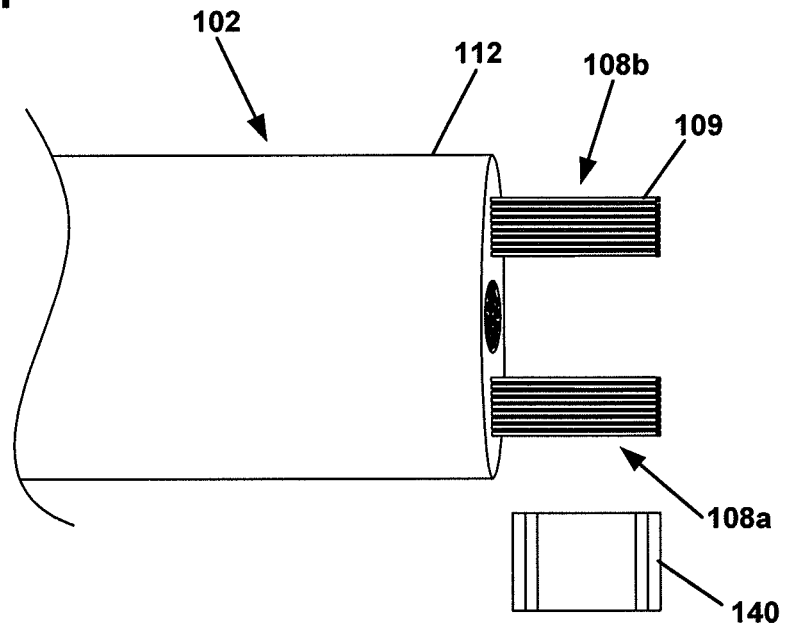

FIG. 14 is a perspective view of the fiber optic cable of FIG. 13.

FIG. 15 is an exploded perspective view of the fiber optic cable assembly of FIG. 6.

FIG. 16 is a representation of a method for installing the cable pulling assembly on an end of the fiber optic cable.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
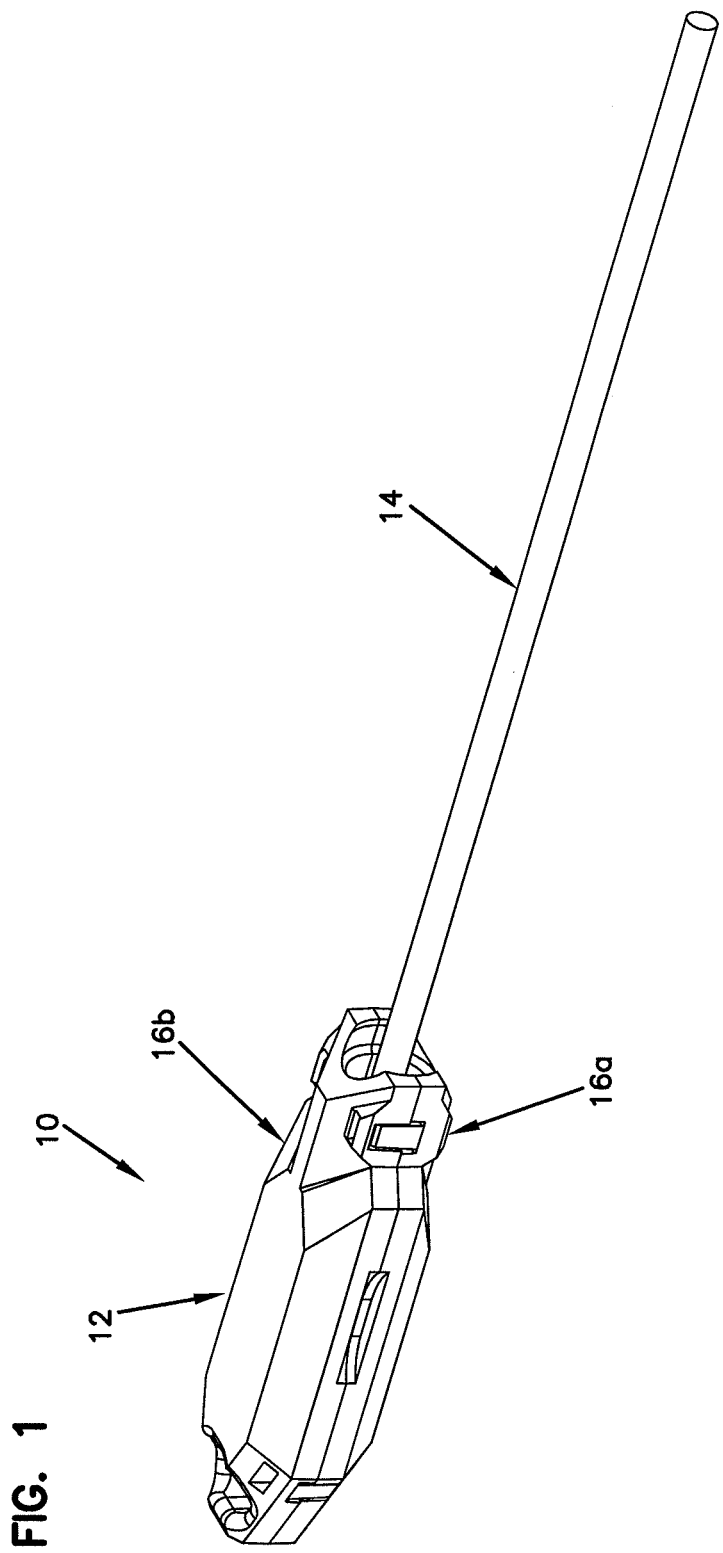
FIG. 1 is a perspective view of a cable pulling assembly having exemplary features of aspects in accordance with the principles of the present disclosure.
Figure 2:
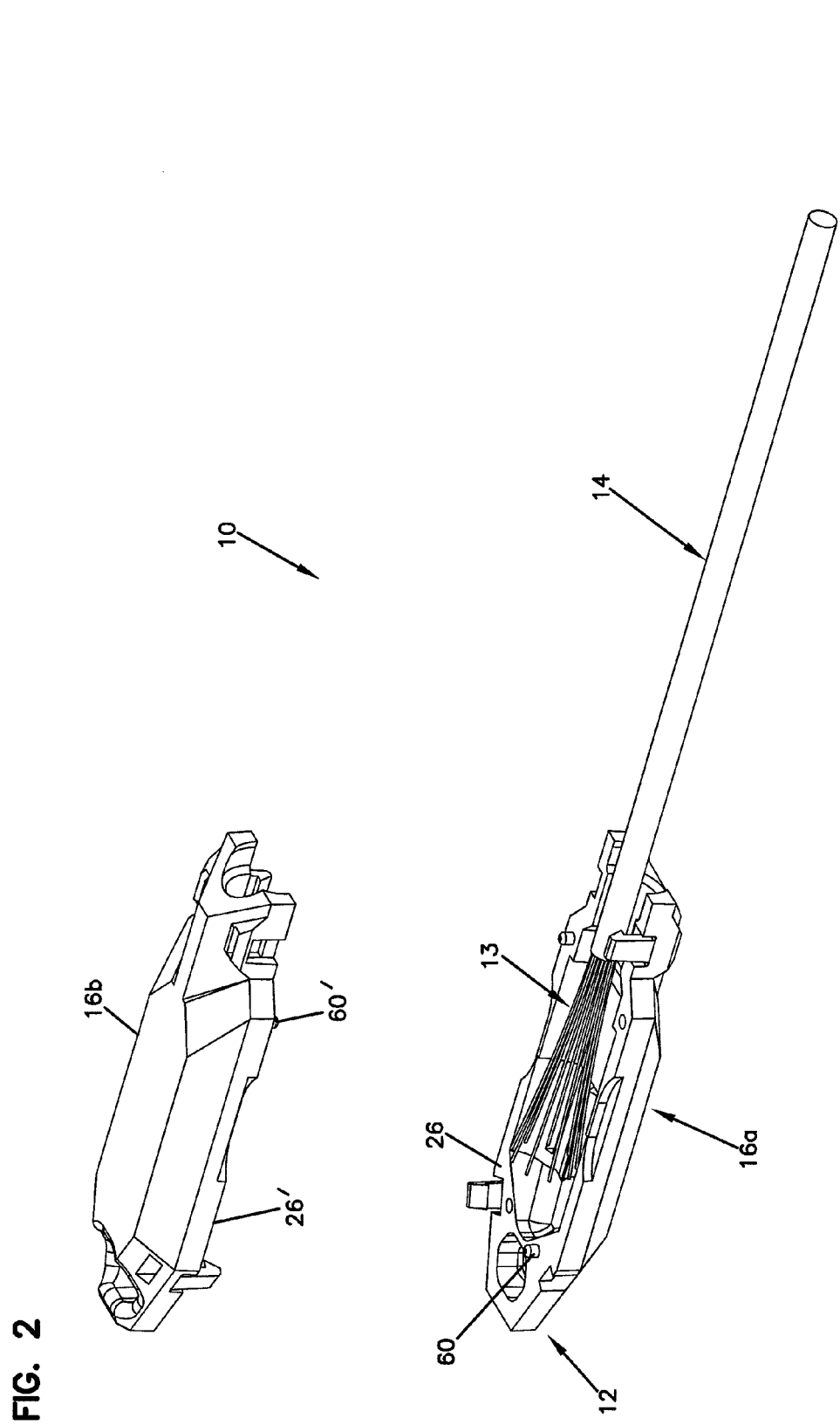
FIG. 2 is an exploded perspective view of the cable pulling assembly of FIG. 1.

Referring now to FIGS. 1 and 2, an alternate embodiment of a cable pulling assembly, generally designated 10, is shown. The cable pulling assembly 10 includes an enclosure 12. The enclosure 12 is adapted to enclose an end 13 of a fiber optic cable 14.

The enclosure 12 of the cable pulling assembly 10 includes a first member 16*a* and a second member 16*b*. The first member 16*a* is adapted for releasable engagement to the second member 16*b*. In one embodiment, the first and second members 16*a*, 16*b* are manufactured from a transparent material. In another embodiment, the first and second members 16*a*, 16*b* are manufactured from a translucent material. In another embodiment, one of the first and second members 16*a*, 16*b* is transparent or translucent. The transparent or translucent material allows the contents of the enclosure 12 to be viewed without disengaging the first and second members 16*a*, 16*b*.

In the depicted embodiment of FIGS. 1 and 2, the first and second members 16*a*, 16*b* are structurally identical. As the first and second members 16*a*, 16*b* are structurally identical, only the first member 16*a* will be described below for ease of description purposes only. It will be understood that the structural features of the first member 16a are included in the second member 16b unless otherwise stated.

Figure 3:
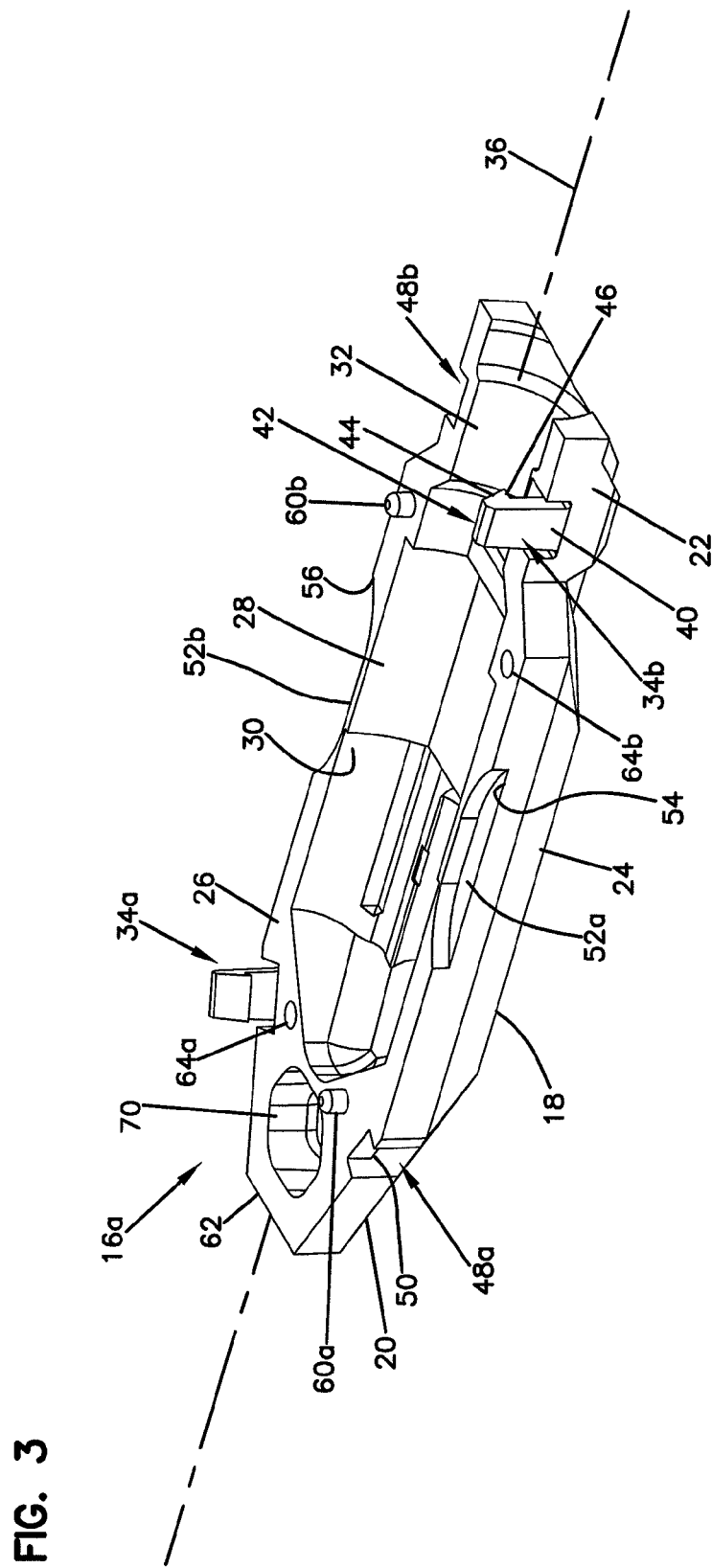
FIG. 3 is a perspective view of a first member of the cable pulling assembly of FIG. 1.

Referring now to FIGS. 2 and 3, the first member 16a includes a body 18. The body 18 of the first member 16a includes a first axial end portion 20 and an oppositely disposed second axial end portion 22.

The body 18 includes a plurality of exterior surfaces 24 and a longitudinal surface 26. The longitudinal surface 26 extends between the first and second axial end portions 20, 22 and is generally planar in shape. The longitudinal surface 26 is adapted to face a corresponding longitudinal surface 26' of the second member 16b when the first and second members 16a, 16b are engaged. In one embodiment, the longitudinal surface 26 of the first member 16a is adapted to abut the corresponding longitudinal surface 26' of the second member 16b when the first and second members 16a, 16b are engaged.

The body 18 defines a cavity 28. The cavity 28 is adapted to receive a portion of the end 13 of the fiber optic cable 14. In one aspect of the present disclosure, the cavity 28 is a blind cavity. As a blind cavity, the cavity 28 does not extend through the first and second axial end portions 20, 22 of the body 18. The blind cavity prevents the fiber optic cable 14 from passing through the first and second axial end portions 20, 22 of the body 18 of the enclosure 12.

The cavity 28 of the first member 16a includes an opening 30 that is defined by the longitudinal surface 26. The opening 30 is adapted to receive the portion of the end 13 of the fiber optic cable 14.

The cavity 28 includes a channel 32 that extends through the second axial end portion 22 of the body 18. In one aspect of the present disclosure, the channel 32 is semi-cylindrical in shape. The channel 32 is adapted to receive a portion of the fiber optic cable 14.

The body 18 further includes a first resilient tab 34a and a second resilient tab 34b. In one aspect of the present disclosure, the first resilient tab 34a is disposed at the first axial end portion 20 of the body 18 while the second resilient tab 34b is disposed at the second axial end portion 22 of the body 18. The first and second tabs 34a, 34b extend outwardly from the body 18 so that the first and second tabs 34a, 34b extend beyond the longitudinal surface 26 of the first member 16a. In another aspect of the present disclosure, the first and second resilient tabs 34a, 34b are disposed on opposite sides of a central longitudinal axis 36 that extends between the first and second axial end portions 20, 22 of the body 18.

Each of the first and second resilient tabs 34a, 34b includes a base end 40 and a free end 42. The base end 40 is engaged to the body 18. The free end 42 extends outwardly from the body 18 in a direction that is generally perpendicular to the longitudinal surface 26. The free end 42 includes a lip portion 44 that extends outwardly from the free end 42. The lip portion 44 includes a lip 46.

The body 18 defines a first groove 48a and a second groove 48b disposed in the exterior surfaces 24 of the body 18. The first and second grooves 48a, 48b include groove openings 50 defined by the longitudinal surface 26. The first groove 48a is disposed in the first axial end portion 20 of the body 18 of the first member 16a on the opposite side of the central longitudinal axis 36 from the first resilient tab 34a while the second groove 48b is disposed in the second axial end portion 22 of the body on the opposite side of the central longitudinal axis 36 from the second resilient tab 34b. The first groove 48a is generally axially aligned with the first resilient tab 34a while the second groove 48b is generally axially aligned with the second resilient tab 34b. Each of the first and second grooves 48a, 48b includes a rim 50.

In one aspect of the present disclosure, the longitudinal surface 26 of the body 18 defines a first recess 52a. The first recess 52a is disposed between the first groove 48a and the second resilient tab 34b. The first recess 52a includes a first opening 54 in one of the exterior surfaces 24. The first recess 52a extends inwardly from the exterior surface 24 toward the cavity 28 in a direction that is generally perpendicular to the central longitudinal axis 36.

In one aspect of the present disclosure, the longitudinal surface 26 of the body 18 further defines a second recess 52b. The second recess 52b is disposed between the first resilient tab 34a and the second groove 48b. The second recess 34b is axially aligned with the first recess 52a. The second recess 52b includes a second opening 56 in one of the exterior surfaces 24. The second recess 52b extends inwardly from the exterior surface 24 toward the cavity 28 in a direction that is generally perpendicular to the central longitudinal axis 36.

The body 18 further includes a plurality of alignment guides 60. In the depicted embodiment of FIGS. 2 and 3, the first member 16a includes a first alignment guide 60a and a second alignment guide 60b. The first and second alignment guides 60a, 60b extend outwardly from the longitudinal surface 26. In the depicted embodiment of FIGS. 2 and 3, the first and second alignment guides 60a, 60b are generally cylindrical in shape.

The first and second alignment guides 60a, 60b are disposed on opposite sides of the central longitudinal axis 36. The first alignment guide 60a is disposed in the first axial end portion 20 of the body 18 while the second alignment guide 60b is disposed in the second axial end portion 22. The first alignment guide 60a is disposed between the first recess 52a and a first end 62 of the first axial end portion 20 of the body 18. The second alignment guide 60b is disposed between the second recess 52b and the second groove 48b.

The longitudinal surface 26 defines a plurality of alignment openings 64. The alignment openings 64 of the first member 16a are adapted to receive corresponding alignment guides 60' of the second member 16b. In the depicted embodiment of FIGS. 2 and 3, the longitudinal surface 26 defines a first alignment opening 64a and a second alignment opening 64b. The first and second alignment openings are disposed on opposite sides of the central longitudinal axis 36. The first alignment opening 64a is disposed in the first axial end portion 20 of the body 18 while the second alignment opening 64b is disposed in the second axial end portion 22. The first alignment opening 64a is axially aligned with the first alignment guide 60a but disposed on the opposite side of the central longitudinal axis 36. The second alignment opening 64b is axially aligned with the second alignment guide 60b but disposed on the opposite side of the central longitudinal axis 36. In the depicted embodiment of FIGS. 2 and 3, the first alignment opening 64a is disposed between the second recess 52b and the first end 62 while the second alignment opening 64b is disposed between the first recess 52a and the first resilient tab 34a.

The body 18 of the first member 16a further defines a thru-passage 70 disposed in the first axial end portion 20 of the body 18. The thru-passage 70 is a hole that extends through the first axial end portion 20 in a direction that is generally perpendicular to the central longitudinal axis 36. The thru-passage 70 is adapted to receive a pulling member (e.g., rope, chain, etc.) for pulling the cable pulling assembly 10 through a passage.

Figure 4:
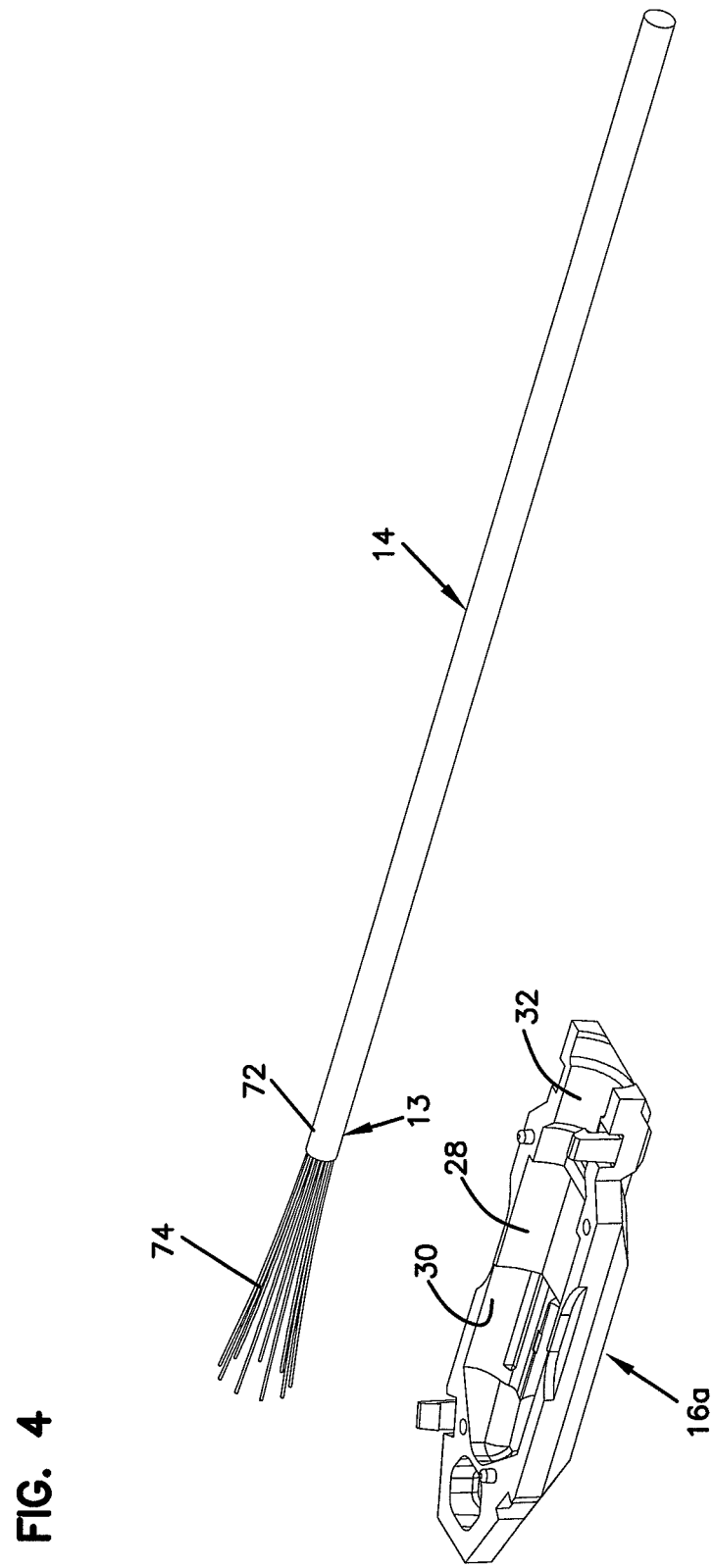
FIG. 4 is an exploded perspective view of a fiber optic cable and the first member of the cable pulling assembly.
Figure 5:
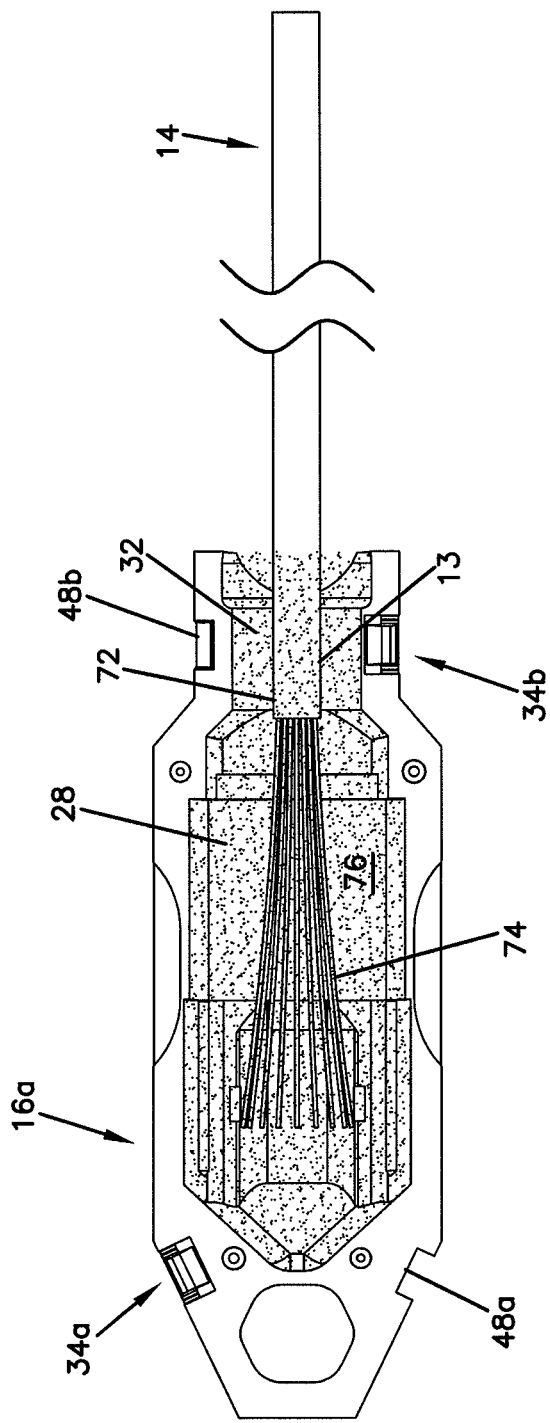
FIG. 5 is a top view of the fiber optic cable and the first member of the cable pulling assembly.

Referring now to FIGS. 2, 4 and 5, a method for installing the cable pulling assembly 10 on the end 13 of the fiber optic cable 14 will be described. In the depicted embodiment of FIGS. 2, 4 and 5, a portion of an outer jacket 72 of the fiber optic cable 14 is stripped from the end 13 of the fiber optic cable 14. With the portion of the outer jacket 72 removed from the end 13 of the fiber optic cable 14, a strength member 74 of the fiber optic cable 14 is exposed. In one embodiment, the strength member 74 is part of a plurality of strength members 74 forming a strength layer of the fiber optic cable 14. In one embodiment, the plurality of strength members 74 can include yarns, fibers, threads, tapes, films, epoxies, filaments or other structures. In the depicted embodiment, the plurality of strength members 74 includes a plurality of aramid yarns (e.g., KEVLAR® yarns). In another embodiment, the strength member 74 is a single strength member such as a rod.

The end 13 of the fiber optic cable 14 with the exposed strength members 74 is inserted through the opening 30 of the cavity 28 of the first member 16a of the enclosure 12. With the end 13 of the fiber optic cable 14 disposed in the cavity 28 of the first member 16a, a remaining portion of the outer jacket 72 of the end 13 is disposed in the channel 32 so that the fiber optic cable 14 extends out the second axial end portion 22 of the cable pulling assembly 10.

With the end 13 of the fiber optic cable 14 disposed in the cavity 28 of the first member 16a, an adhesive 76 (shown as shading in FIG. 5) is added to the cavity 28. In one embodiment, the adhesive 76 is an epoxy. When the adhesive 76 is cured, the adhesive 76 bonds the outer jacket 72 and the plurality of strength members 74 of the end 13 of the fiber optic cable 14 to the cavity 28 of the first member 16a. With the adhesive 76 in the cured state, the end 13 of the fiber optic cable 14 in the cavity 28 is secured in the first member 16a.

The second member 16b is then engaged to the first member 16a. To engage the first and second members 16a, 16b, the longitudinal surface 26' of the second member 16b is oriented so that it faces the longitudinal surface 26 of the first member 16a. With the longitudinal surfaces 26, 26' of the first and second members 16a, 16b facing each other, the first and second resilient tabs 34a, 34b of the first member 16a are aligned with the first and second grooves 48a, 48b of the second member 16b and the first and second alignment guides 60a, 60b are aligned with the first and second alignment openings 64a, 64b.

One of the first and second members 16b is then pushed toward the other of the first and second members 16a, 16b until the lips 46 of the first and second resilient tabs 34a, 34b of the first and second members 16a, 16b engage the corresponding rims 50 of the first and second grooves 48a, 48b of the first and second members 16a, 16b. In one embodiment, the first and second members 16a, 16b are pushed together until an audible clicking sound is heard. The audible clicking sound is produced by the engagement of the first and second resilient tabs 34a, 34b of the first and second members 16a, 16b to the rims 50 of the first and second grooves 48a, 48b of the first and second members 16a, 16b.

With the first and second resilient tabs 34a, 34b of the first and second members 16a, 16b engaged with the corresponding first and second grooves 48a, 48b on the mating member, the first and second alignment guides 60a, 60b of the first and second members 16a, 16b are disposed in the corresponding alignment openings 64a, 64b of the mating member. The engagement between the first and second alignment guides 60a, 60b and the first and second alignment openings 64a, 64b prevents inadvertent disengagement caused by rotation of one of the first and second members 16a, 16b relative to the other of the first and second members 16a, 16b.

Referring still to FIGS. 2, 4 and 5, a method for installing the cable pulling assembly 10 on the end 13 of the fiber optic cable 14 will be described. A portion of the outer jacket 72 is stripped from the end 13 of the fiber optic cable 14 so that the strength members 74 are exposed. With the strength members 74 of the end 13 of the fiber optic cable 14 exposed, the end 13 is inserted through the opening 30 of the cavity 28 of the first member 16a of the enclosure 12.

The second member 16b is then engaged to the first member 16a by pushing one of the first and second members 16b toward the other of the first and second members 16a, 16b until the lips 46 of the first and second resilient tabs 34a, 34b of the first and second members 16a, 16b engage the corresponding rims 50 of the first and second grooves 48a, 48b of the first and second members 16a, 16b. With the first and second members 16a, 16b engaged and the end 13 of the fiber optic cable 14 disposed in the cavity 28, adhesive 76 is injected into the cavity 28 of the enclosure 12 through the channel 32.

After the adhesive 76 cures, a pulling member is inserted through the thru-passage 70 of the first and second members 16a, 16b. The fiber optic cable 14 can then be pulled to the desired location.

In conventional cable pullers, the cable puller is fixed to the cable jacket of the fiber optic cable. As the fiber optic cable is pulled to its desired location, the tensile force acting on the cable puller is transferred to the cable jacket, which causes the cable jacket to stretch. After the pulling of the fiber optic cable is complete, the cable jacket returns to its original (i.e., unstretched) length. As the cable jacket returns to its original length, micro-bends in the optical fiber of the fiber optic cable are created. The micro-bends can cause attenuation loses in the fiber optic cable.

The cable pulling assembly 10 of the present disclosure reduces the risk of micro-bends by bonding the enclosure 12 to the strength layer of the fiber optic cable 14. With the adhesive 76 bonding the enclosure 12 and the strength members 74 of the fiber optic cable 14, the risk of creating micro-bends in an optical fiber of the fiber optic cable 14 is reduced since the pulling force applied to the enclosure 12 is carried by the strength members 74 of the fiber optic cable 14. By applying the tensile force to the strength members 74, the amount of stretching of the outer jacket 74 is reduced.

After the fiber optic cable 14 has been pulled to the desired location, the cable pulling assembly 10 can be removed from the fiber optic cable 14. In one embodiment, the cable pulling assembly 10 is removed from the fiber optic cable 14 by cutting off the end 13 of the fiber optic cable 14 from the fiber optic cable 14. In one aspect of the present disclosure, the cable pulling assembly 10 is reusable. In another aspect of the present disclosure, the cable pulling assembly 10 is disposable.

Referring now to FIG. 6, a fiber optic cable assembly 100 is shown. The fiber optic cable assembly 100 includes a fiber optic cable 102 and a cable pulling assembly 104.

The fiber optic cable 102 includes an outer jacket 106 that surrounds at least one optical fiber and at least one strength member 108 (e.g., glass fibers, rods, yarns, threads, tapes, films, epoxies, filaments, combinations thereof, etc.). In one embodiment, the fiber optic cable 102 includes a plurality of optical fibers.

In one embodiment, the strength member 108 includes a plurality of strength elements 109 (shown in FIG. 13) disposed in a binder material 110. The strength elements 109 extend the length of the fiber optic cable 102. In one embodiment, the strength elements 109 are glass fibers or rods (e.g., E-glass, S-glass, etc.) while the binder material 110 is a polymeric material such as acetate acrylite (e.g., UV-cured, etc.), silicon (e.g., RTV, etc.), polyester films (e.g., biaxially oriented polyethylene terephthalate polyester film, etc.), and polyisobutylene. In other embodiments, the binder material 110 may be a matrix material, an adhesive material, a finish material, or another type of material that binds, couples or otherwise mechanically links together strength elements 109.

The fiber optic cable 102 includes a first end 111 and an oppositely disposed second end 112. The first end 111 is a terminated end while the second end 112 is an unterminated end.

In one embodiment, the first end 111 can be terminated with a multi-fiber optic connector such as the one described in U.S. Pat. No. 7,264,402, which is hereby incorporated by reference in its entirety. In another embodiment, the first end 111 is connected to a fan-out having optical fibers that are terminated by a plurality of single fiber connectors. In one embodiment, the fan-out is disposed in a fiber optic drop terminal, such as those described in U.S. Pat. Nos. 7,397,997 and 7,512,304, both of which are hereby incorporated by reference in their entireties.

Referring now to FIGS. 7-12, the cable pulling assembly 104 is shown. The cable pulling assembly 104 includes an enclosure 114. The enclosure 114 is adapted to enclose the second end 112 of the fiber optic cable 102. The enclosure 114 includes a body 116 having a plurality of outer surfaces 118. In the depicted embodiment, the body 116 includes a first surface 118a, an oppositely disposed second surface 118b, a first side surface 118c that extends between the first and second surfaces 118a, 118b, an oppositely disposed second side surface 118d, a first end surface 118e and an oppositely disposed second end surface 118f. In the depicted embodiment, the first end surface 118e is arcuate in shape.

In the depicted embodiment, the body 116 is a single piece that is adapted to surround the second end 112 of the fiber optic cable 102. The enclosure 114 defines a central longitudinal axis 120 and includes a first axial end 122 and an oppositely disposed second axial end 124.

The enclosure 114 further defines a cavity 126 that extends along the central longitudinal axis 120. The cavity 126 is adapted to receive the second end 112 of the fiber optic cable 102. The cavity 126 includes a first portion 128 having a first end 130 and a second portion 132 having a second end 134. The second end 134 of the cavity 126 is an opening 134 through which the second end 112 of the fiber optic cable 102 is inserted.

The first portion 128 is disposed adjacent to the first axial end 122 of the enclosure 114 and the second portion 132 is disposed adjacent to the second axial end 124 of the enclosure 114. The first portion 128 is adapted to receive the optical fibers and the strength member 108 of the fiber optic cable 102 while the second portion 132 is adapted to receive the outer jacket 106 of the fiber optic cable 102. In the depicted embodiment, the first portion 128 has a width W1 that is less than a width W2 of the second portion 132. The greater width W2 of the second portion 132 allows a portion of the outer jacket 106 of the fiber optic cable 102 to be inserted into the second portion 132.

The enclosure 114 further defines a thru-passage 135 disposed adjacent to the first axial end 122 of the enclosure 114. The thru-passage 135 is a hole that extends through the enclosure 114 in a direction that is generally perpendicular to the central longitudinal axis 120. The thru-passage 135 extends through the enclosure 114 at a location between the first axial end 122 of the enclosure and the first end 130 of the cavity 126. In the depicted embodiment, the thru-passage 135 does not intersect the cavity 126. The thru-passage 135 is adapted to receive a pulling member (e.g., rope, chain, etc.) for pulling the cable pulling assembly 104 through a passage.

In the depicted embodiment, the enclosure 114 further defines a fill port 136 disposed on the first surface 118a. The fill port 136 is disposed between the second axial end 124 of the enclosure 114 and the thru-passage 134. In the depicted embodiment, the fill port 136 is aligned with the first portion 128 of the cavity 126. The fill port 136 is a hole that extends through the first surface 118a and into the first portion 128 of the cavity 126. The fill port 136 defines an axis 138 that is generally perpendicular to the central longitudinal axis 120 of the enclosure 114.

Referring now to FIGS. 13-16, a method 200 of installing the cable pulling assembly 104 on the second end 112 of the fiber optic cable 102 will be described. In step 202, a portion of the outer jacket 106 is stripped from the second end 112 of the fiber optic cable 102 so that the strength member 108 is exposed. In certain embodiment, the optical fibers of the fiber optic cable 102 are trimmed so that the optical fibers do not extend beyond the outer jacket 106. In certain embodiments, only the strength member 108 is exposed. In the depicted embodiment, the fiber optic cable 102 includes a first strength member 108a and a second strength member 108b.

If the strength members 108a, 108b include the binder material 110, the exposed first and second strength members 108a, 108b are positioned adjacent to a heat source 140 in step 204. The heat source 140 heats the first and second strength members 108a, 108b. In one embodiment, the heat source 140 is a heating element that converts electricity to heat. In another embodiment, the heat source 140 includes a combustible fuel that is converted to heat by combustion.

In step 206, the first and second strength members 108a, 108b are heated by the heat source 140 until the binder material 110 is melted or evaporated. With the binder material 110 melted or evaporated, the strength elements 109 of the first and second strength members 108a, 108b are exposed. While the heat provided by the heat source 138 is enough to melt or evaporate the binder material 110, the heat does not structurally damage the strength elements 109. It will be understood that steps 204 and 206 of the method 200 can be excluded if the first and second strength members 108a, 108b do not include the binder material 110.

In step 208, the second end 112 of the fiber optic cable 102 is inserted into the opening 134 of the cavity 126 of the enclosure 114. The second end 112 is positioned in the cavity 126 so that the outer jacket 106 is disposed in the second portion 132 of the cavity 126 while the strength members 108a, 108b are disposed in the first portion 128.

With the second end 112 of the fiber optic cable 102 inserted into the cavity 126, an adhesive is injected into the cavity 126 in step 210. In the depicted embodiment, the adhesive is injected into the cavity 126 through the fill port 136. In one embodiment, the adhesive is an epoxy. The adhesive is adapted to secure the first and second strength members 108a, 108b to the enclosure 114. In step 212, the adhesive is cured.

After the adhesive cures, a pulling member is inserted through the thru-passage 135 of the enclosure 114 in step 214. The second end 112 of the fiber optic cable 102 can then be pulled to the desired location. After the second end 112 of the fiber optic cable 102 has been pulled to the desired location, the cable pulling assembly 104 can be removed from the fiber optic cable 102. In one embodiment, the cable pulling assembly 104 is removed from the fiber optic cable 102 by cutting off the second end 112 of the fiber optic cable 104. In one aspect of the present disclosure, the enclosure 114 of the cable pulling assembly 104 is reusable. In another aspect of the present disclosure, the enclosure 114 of the cable pulling assembly 104 is disposable.

In one embodiment, the cable pulling assembly 104 can be preinstalled on the second end 112 of the fiber optic cable 102 at a factory. In another embodiment, the cable pulling assembly 104 can be installed on the second end 112 of the fiber optic cable 102 in the field.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A fiber optic cable assembly comprising:
   a fiber optic cable having a first end and an oppositely disposed second end, the fiber optic cable further including:
      an outer jacket; and
      a pair of strength members disposed in the outer jacket, the pair of strength members including stripped end portions that extend beyond the outer jacket; and
   a cable pulling assembly engaged to the second end of the fiber optic cable, the cable pulling assembly including:
      an enclosure defining a unitary cavity with a perimeter that extends around the stripped end portions of the pair of strength members, wherein the second end of the fiber optic cable is disposed in the unitary cavity; and
      an adhesive disposed in the unitary cavity, wherein the adhesive directly secures the stripped end portions of the pair of strength members of the fiber optic cable to the enclosure within the unitary cavity.

2. The fiber optic cable assembly of claim 1, wherein the enclosure includes a first axial end and an oppositely disposed second axial end and defines a thru-passage that extends through the enclosure at a location adjacent to the first axial end.

3. The fiber optic cable assembly of claim 2, wherein the thru-passage extends through the enclosure in a direction that is generally perpendicular to a central longitudinal axis of the enclosure.

4. The fiber optic cable assembly of claim 2, wherein the unitary cavity includes a first portion disposed adjacent to the first axial end and a second portion defining an opening at the second axial end of the enclosure, a width of the first portion being less than a width of the second portion.

5. The fiber optic cable assembly of claim 4, wherein the enclosure defines a fill port that extends through an outer surface of the enclosure and into the first portion of the unitary cavity.

6. The fiber optic cable assembly of claim 1, wherein the enclosure is a single piece.

7. The fiber optic cable assembly of claim 1, wherein the pair of strength members of the fiber optic cable includes a first strength member and a second strength member disposed in the outer jacket.

8. The fiber optic cable assembly of claim 7, wherein each of the first and second strength members includes a plurality of strength elements disposed in a binder material.

9. A fiber optic cable assembly comprising:
   a fiber optic cable having a first end and an oppositely disposed second end, the fiber optic cable further including:
      an outer jacket; and
      a plurality of strength members disposed in the outer jacket; and
   a cable pulling assembly engaged to the second end of the fiber optic cable, the cable pulling assembly including:
      an enclosure having an outer surface and defining a unitary cavity, the enclosure including a first member and a second member that are oppositely positioned about the plurality of strength members, the first member and the second member adapted to attach to each other, wherein the second end of the fiber optic cable is disposed in the unitary cavity; and
      an adhesive disposed in the unitary cavity, wherein the adhesive directly secures the plurality of strength members of the fiber optic cable to the enclosure within the unitary cavity.

10. The fiber optic cable assembly of claim 9, wherein the cable pulling assembly is adapted to be pre-installed at a factory location.

11. The fiber optic cable assembly of claim 9, wherein the plurality of strength members is selected from the group consisting of glass fibers, rods, yarns, threads, tapes, films, epoxies, and filaments.

12. The fiber optic cable assembly of claim 9, wherein the plurality of strength members include a strength element disposed in a binder material.

13. The fiber optic cable assembly of claim 9, wherein the unitary cavity includes a first portion disposed adjacent to a first axial end of the enclosure and a second portion defining an opening at a second axial end of the enclosure, a width of the second portion being less than a width of the first portion.

14. The fiber optic cable assembly of claim 13, wherein the plurality of strength members of the fiber optic cable are disposed in the first portion and a portion of the outer jacket of the second end of the fiber optic cable is disposed in the second portion.

15. A method of installing a cable pulling assembly to a fiber optic cable, the method comprising:
    stripping an outer jacket off an end of a fiber optic cable so that end portions of a pair of strength members of the fiber optic cable are exposed;
    inserting the exposed end portions of the pair of strength members of the fiber optic cable into a perimeter of a unitary cavity of an enclosure of a cable pulling assembly; and
    adding an adhesive to the unitary cavity of the enclosure so that the adhesive directly bonds the exposed end portions of the pair of strength members to the enclosure within the unitary cavity.

16. The method of claim 15, wherein the step of adding the adhesive to the unitary cavity is done after the exposed end portions of the pair of strength members of the fiber optic cable are inserted into the perimeter of the unitary cavity.

17. The method of claim 15, wherein the adhesive is injected through a fill port that extends through an outer surface of the enclosure and into the unitary cavity.

18. The method of claim 15, further comprising heating a binder material of the pair of strength members of the fiber optic cable using a heat source to expose strength elements of the pair of strength members.

19. The method of claim 18, wherein the strength elements are glass fibers and the binder material is selected from the group consisting of acetate acrylite, silicon, polyester films, and polyisobutylene.

20. The method of claim 15, further comprising inserting a pulling member through a thru-passage defined by the enclosure.

* * * * *